United States Patent
Thomas

(10) Patent No.: US 10,466,916 B2
(45) Date of Patent: Nov. 5, 2019

(54) SYSTEM AND METHOD OF DYNAMIC WRITE PROTECT OF STORAGE DEVICES EXPOSED BY BASEBOARD MANAGEMENT CONTROLLER (BMC)

(71) Applicant: AMERICAN MEGATRENDS INTERNATIONAL, LLC, Norcross, GA (US)

(72) Inventor: Satheesh Thomas, Dunwoody, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 66 days.

(21) Appl. No.: 14/697,968

(22) Filed: Apr. 28, 2015

(65) Prior Publication Data

US 2016/0320985 A1    Nov. 3, 2016

(51) Int. Cl.
*G06F 3/06* (2006.01)
*G06F 21/85* (2013.01)

(52) U.S. Cl.
CPC ............ *G06F 3/0622* (2013.01); *G06F 3/067* (2013.01); *G06F 3/0637* (2013.01); *G06F 3/0683* (2013.01); *G06F 21/85* (2013.01)

(58) Field of Classification Search
CPC ............ G06F 12/1491; G06F 12/0246; G06F 12/1458; G06F 21/6227; G06F 2221/2141; G06F 2221/2149; G06F 21/78; G06F 21/60; G06F 3/062; G06F 21/10; G06F 21/70; G06F 12/145; G06F 12/0868; G06F 3/0637; G06F 3/00; G06F 3/06–0689; G06F 5/00–16; G06F 9/00–548;
(Continued)

(56) References Cited

U.S. PATENT DOCUMENTS 6,779,118 B1 *  8/2004  Ikudome .................. H04L 29/06
                                                    726/14
7,234,082 B2 *  6/2007  Lai ....................... G06F 11/3006
                                                    709/223
(Continued)

OTHER PUBLICATIONS https://www.techopedia.com/definition/2322/usb-flash-drive, Techopedia, Jan. 3, 2015 (Year: 2015).*

*Primary Examiner* — Daniel C. Chappell
(74) *Attorney, Agent, or Firm* — Locke Lord LLP; Tim Tingkang Xia, Esq.

(57) ABSTRACT

A system including a baseboard management controller (BMC) and a storage device connected to the BMC, for dynamic protection of the storage device. The BMC includes a processor and a non-volatile memory storing a computer executable code. The computer executable code, when executed at the processor, is configured to: perform redirection of the storage device; receive a write protect command including write protect information of the storage device; extract the write protect information from the write protect command; store the write protect information in a data store of the non-volatile memory; and in response to receiving a write command to write data in the storage device, determine whether the data is writable to the storage device based on the write protect information stored in the data store. The data is written to the storage device only if it is determined that the data is writable to the storage device.

18 Claims, 5 Drawing Sheets

(58) Field of Classification Search
CPC ..... G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 7,484,084 B1* | 1/2009 | Ranaweera | G06F 8/67 |
| | | | 713/1 |
| 7,555,676 B2* | 6/2009 | Lopez, Jr. | G06F 11/2294 |
| | | | 714/27 |
| 8,340,120 B2* | 12/2012 | Balakavi | H04L 49/602 |
| | | | 370/463 |
| 9,098,302 B2* | 8/2015 | Swanson | G06F 9/4406 |
| 10,156,987 B1* | 12/2018 | Gutierrez | G06F 11/3058 |
| 2008/0250509 A1* | 10/2008 | Ahvenainen | G06F 12/1441 |
| | | | 726/34 |
| 2013/0094271 A1* | 4/2013 | Schuetz | G11C 5/06 |
| | | | 365/63 |
| 2013/0179624 A1* | 7/2013 | Lambert | G06F 12/0246 |
| | | | 711/103 |
| 2014/0082224 A1* | 3/2014 | Kim | G06F 3/0659 |
| | | | 710/5 |
| 2014/0280756 A1* | 9/2014 | Maity | H04L 67/06 |
| | | | 709/219 |
| 2019/0034382 A1* | 1/2019 | Hargrave | G06F 15/17331 |
| 2019/0073285 A1* | 3/2019 | Hayashida | G06F 11/2284 |
| 2019/0108158 A1* | 4/2019 | Kachare | G06F 13/1668 |

* cited by examiner 160-3

| Blocks 1: write protected blocks | Blocks 2: write allowed blocks | Blocks 3: write protected blocks | Blocks 4: write allowed blocks | Blocks 5: write protected blocks | Blocks 6: write allowed blocks |

FIG. 2C 160-3

| Blocks 1: write allowed blocks | Blocks 2: write allowed blocks | Blocks 3: write allowed blocks | Blocks 4: write allowed blocks | Blocks 5: write allowed blocks | Blocks 6: write allowed blocks |

FIG. 2B

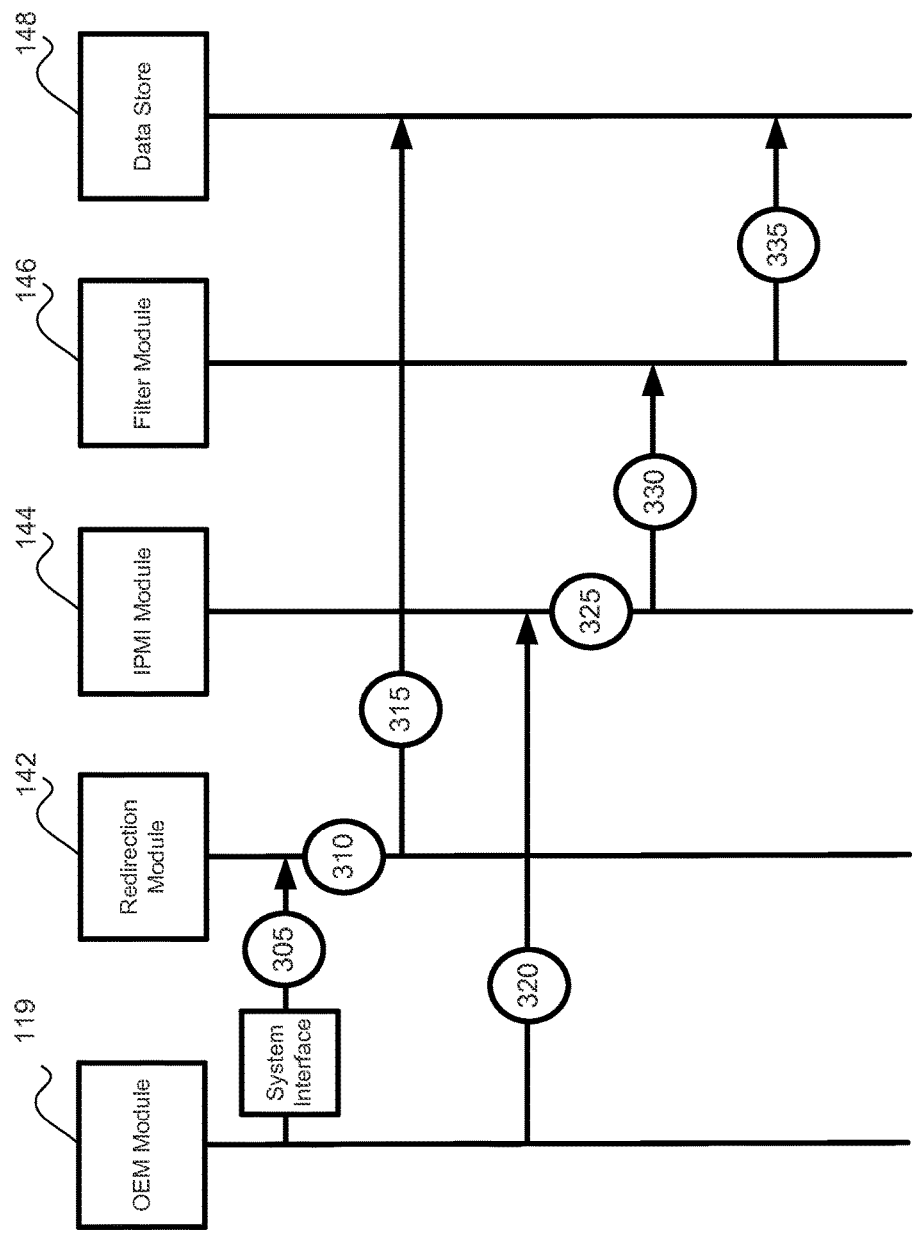

SYSTEM AND METHOD OF DYNAMIC WRITE PROTECT OF STORAGE DEVICES EXPOSED BY BASEBOARD MANAGEMENT CONTROLLER (BMC)

FIELD

The present disclosure relates generally to baseboard management controller (BMC) technology, and more particularly to systems and methods of dynamic write protect of storage devices exposed by a BMC.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A baseboard management controller (BMC) refers to a specialized microcontroller that manages the interface between system management software and platform hardware. The BMC may be embedded on the baseboard or motherboard of a computer, generally a host system or a server. For example, different types of sensors can be built into the computer system, and the BMC reads these sensors to obtain parameters such as temperature, cooling fan speeds, power status, operating system (OS) status, etc.

The BMC could expose local images stored locally for the BMC or images stored remotely in the network, as disks for the host system. The disks may need to read or write as the case may be. However, in some cases, it is critical for write protecting the part or whole of the disks exposed in the above manner.

Therefore, an unaddressed need exists in the art to address the aforementioned deficiencies and inadequacies.

SUMMARY

In one aspect, the disclosure is directed to a system including a baseboard management controller (BMC) and at least one storage device connected to the BMC, for dynamic protection of the at least one storage device. In certain embodiments, the BMC includes a processor and a non-volatile memory storing a computer executable code. The computer executable code, when executed at the processor, is configured to:

perform redirection of the at least one storage device, such that the at least one storage device is accessible by a computing device;

receive a write protect command comprising write protect information of the at least one storage device;

extract the write protect information from the write protect command;

store the write protect information in a data store of the non-volatile memory;

in response to receiving, from the computing device, a write command to write data in the at least one storage device, determine whether the data is writable to the at least one storage device based on the write protect information stored in the data store; and in response to determining the data to be writable to the at least one storage device, write the data to the at least one storage device.

In certain embodiments, when the data is determined to be not writable to the at least one storage device, the data is not written to the at least one storage device.

In certain embodiments, the computer executable code, when executed at the processor, is further configured to:

in response to receiving a read command to read data from the at least one storage device from the computing device, read the data from the at least one storage device.

In certain embodiments, the computer executable code, when executed at the processor, is configured to perform redirection of the at least one storage device by:

receiving a redirection command from the computing device comprising redirect information of the at least one storage device;

processing the received redirection command to extract the redirect information; and storing the redirect information in the data store.

In certain embodiments, the write protect command is an intelligent platform management interface (IPMI) original equipment manufacturer (OEM) command.

In certain embodiments, the write protect information includes:

a mode identifier, configured to define a write protect status of one of the at least one storage device, wherein the write protect status is selected from write protect on or write protect off;

a device identifier, for identifying the one of the at least one storage device; and an array storing a plurality of address values, wherein the address values are configured to define a write-protected portion of the one of the at least one storage device.

In certain embodiments, the computer executable code, when executed at the processor, is configured to determine whether the data is writable to the at least one storage device based on the write protect information by:

retrieving device information from the write command, wherein the device information indicates a specific storage device from the at least one storage device, and the data is to be written to the specific storage device;

determining the specific storage device by comparing the device information from the write command with the device identifier of the write protect information stored in the data store; and determining whether the data is writable to the specific storage device by checking the mode identifier of the write protect information corresponding to the specific storage device, where the data is writable to the specific storage device when the mode identifier of the write protect information corresponding to the specific storage device indicates the write protect status of the specific storage device to be write protect off.

In certain embodiments, the computer executable code, when executed at the processor, is further configured to determine whether the data is writable to the at least one storage device based on the write protect information by:

retrieving address information from the write command, where the address information indicates a specific address in the specific storage device;

when the mode identifier of the write protect information corresponding to the specific storage device indicates the write protect status of the specific storage device to be write protect on, determining whether the data is writable to the specific address in the specific storage device by comparing the address information from the write command with the address values of the write protect information corresponding to the specific storage device.

In certain embodiments, the computer executable code includes:

an IPMI module, configured to receive the IPMI OEM command, and extract the write protect information from the IPMI OEM command;

a filter module, configured to store the write protect information in the data store; and a redirection module, configured to:

perform redirection of the at least one storage device; and in response to receiving the write command, send the write command to the filter module, where the filter module, in response to receiving the write command from the redirection module, is configured to:

in response to receiving the write command, determine whether the data is writable to the at least one storage device based on the write protect information; and when the data is determined to be writable to the at least one storage device, write the data to the at least one storage device.

In certain embodiments, the redirection module is further configured to:

in response to receiving the read command to read data from the at least one storage device from the computing device, read the data from the at least one storage device.

In certain embodiments, the at least one storage device is remotely connected to the BMC via a network.

In another aspect, the disclosure is directed to a method of dynamic write protect. The method includes:

performing, at a processor of a baseboard management controller (BMC), a redirection of at least one storage device connected to the BMC, such that the at least one storage device is accessible by a computing device;

receiving, at the processor of the BMC, a write protect command comprising write protect information of the at least one storage device;

extracting, by the processor of the BMC, the write protect information from the write protect command;

storing, by the processor of the BMC, the write protect information in a data store of a non-volatile memory of the BMC;

in response to receiving, from the computing device, a write command to write data in the at least one storage device, determining whether the data is writable to the at least one storage device based on the write protect information stored in the data store; and in response to determining the data to be writable to the at least one storage device, writing the data to the at least one storage device.

In certain embodiments, when the data is determined to be not writable to the at least one storage device, the data is not written to the at least one storage device.

In certain embodiments, the method further includes: in response to receiving a read command to read data from the at least one storage device from the computing device, reading the data from the at least one storage device.

In certain embodiments, the step of performing a redirection of the at least one storage device connected to the BMC includes:

receiving a redirection command from the computing device comprising redirect information of the at least one storage device;

processing the received redirection command to extract the redirect information; and storing the redirect information in the data store.

In certain embodiments, the write protect command is an intelligent platform management interface (IPMI) original equipment manufacturer (OEM) command.

In certain embodiments, the write protect information includes:

a mode identifier, configured to define a write protect status of one of the at least one storage device, wherein the write protect status is selected from write protect on or write protect off;

a device identifier, for identifying the one of the at least one storage device; and an array storing a plurality of address values, wherein the address values are configured to define a write-protected portion of the one of the at least one storage device.

In certain embodiments, the step of determining whether the data is writable to the at least one storage device based on the write protect information includes:

retrieving device information and address information from the write command, wherein the device information indicates a specific storage device from the at least one storage device, and the data is to be written to the specific storage device, and wherein the address information indicates a specific address in the specific storage device;

determining the specific storage device by comparing the device information from the write command with the device identifier from the write protect information stored in the data store; and determining whether the data is writable to the specific storage device by:

checking the mode identifier of the write protect information corresponding to the specific storage device, wherein the data is writable to the specific storage device when the mode identifier of the write protect information corresponding to the specific storage device indicates the write protect status of the specific storage device to be write protect off; and when the mode identifier of the write protect information corresponding to the specific storage device indicates the write protect status of the specific storage device to be write protect on, determining whether the data is writable to the specific address in the specific storage device by comparing the address information from the write command with the address values of the write protect information corresponding to the specific storage device.

In certain embodiments, the at least one storage device is remotely connected to the BMC via a network.

In a further aspect, the disclosure is directed to a non-transitory computer readable medium storing computer executable code. In certain embodiments, the computer executable code, at a processor of a baseboard management controller (BMC), is configured to:

redirection of at least one storage device connected to the BMC, such that the at least one storage device is accessible by a computing device;

receive a write protect command comprising write protect information of the at least one storage device;

extract the write protect information from the write protect command;

store the write protect information in a data store of a non-volatile memory of the BMC;

in response to receiving, from the computing device, a write command to write data in the at least one storage device, determine whether the data is writable to the at least one storage device based on the write protect information stored in the data store; and in response to determining the data to be writable to the at least one storage device, write the data to the at least one storage device.

In certain embodiments, when the data is determined to be not writable to the at least one storage device, the data is not written to the at least one storage device.

In certain embodiments, the computer executable code, when executed at the processor, is further configured to:

in response to receiving a read command to read data from the at least one storage device from the computing device, read the data from the at least one storage device.

In certain embodiments, the computer executable code, when executed at the processor, is configured to perform redirection of the at least one storage device by:

receiving a redirection command from the computing device comprising redirect information of the at least one storage device;

processing the received redirection command to extract the redirect information; and storing the redirect information in the data store.

In certain embodiments, the write protect command is an intelligent platform management interface (IPMI) original equipment manufacturer (OEM) command.

In certain embodiments, the write protect information includes:

a mode identifier, configured to define a write protect status of one of the at least one storage device, wherein the write protect status is selected from write protect on or write protect off;

a device identifier, for identifying the one of the at least one storage device; and an array storing a plurality of address values, wherein the address values are configured to define a write-protected portion of the one of the at least one storage device.

In certain embodiments, the computer executable code, when executed at the processor, is configured to determine whether the data is writable to the at least one storage device based on the write protect information by:

retrieving device information and address information from the write command, wherein the device information indicates a specific storage device from the at least one storage device, and the data is to be written to the specific storage device, and wherein the address information indicates a specific address in the specific storage device;

determining the specific storage device by comparing the device information from the write command with the device identifier from the write protect information stored in the data store; and determining whether the data is writable to the specific storage device by:

checking the mode identifier of the write protect information corresponding to the specific storage device, wherein the data is writable to the specific storage device when the mode identifier of the write protect information corresponding to the specific storage device indicates the write protect status of the specific storage device to be write protect off; and when the mode identifier of the write protect information corresponding to the specific storage device indicates the write protect status of the specific storage device to be write protect on, determining whether the data is writable to the specific address in the specific storage device by comparing the address information from the write command with the address values of the write protect information corresponding to the specific storage device.

In certain embodiments, the at least one storage device is remotely connected to the BMC via a network.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 2B schematically depicts a disk according to certain embodiments of the present disclosure, where all the blocks of the disk are writable.

FIG. 2C schematically depicts a disk according to certain embodiments of the present disclosure, where several portions of the disk are write protected.

FIG. 3 schematically depicts a method of write protect configuring of a system according to certain embodiments of the present disclosure.

DETAILED DESCRIPTION

Figure 1:
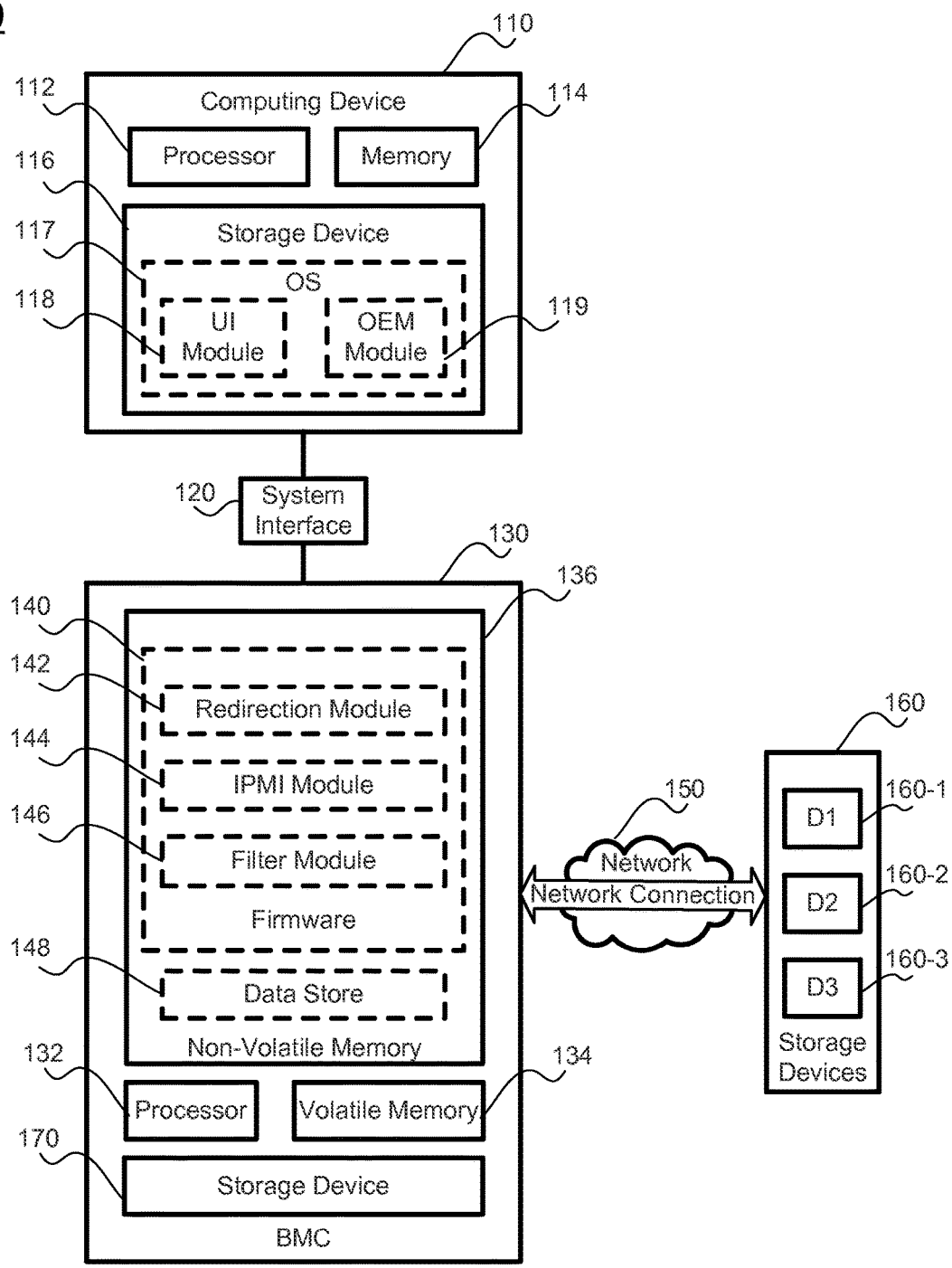
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, a BMC has a flash memory or other types of non-volatile memory to store its firmware and other necessary configuration data.

In one aspect, the present disclosure is directed to a system that is capable of performing dynamic write protect for whole or section of the VM disks exposed by BMC. In order to achieve dynamic write protect, an IPMI command is used to define certain disks or certain portions of the disks that are protected. When a write command related to those disks is received, the BMC checks whether the disks or the portions of the disks for writing is write protected or not. If the disks or the portions of the disks are write protected, the command of writing is prohibited.

FIG. 1 schematically depicts a system according to certain embodiments of the present disclosure. As shown in FIG. 1, the system 100 includes a computing device 110 and a BMC 130. The BMC 130 is connected to the computing device 110 via a system interface 120. The system 100 may be a system that incorporates more than one interconnected system, such as a client-server network. The network may be a wired or wireless network, and may be of various forms such as a local area network (LAN) or wide area network (WAN) including the Internet. In certain embodiments, the system 100 may include other physical or virtual components not shown in FIG. 1.

The system interface 120 is an interface to perform data transfer between the computing device 110 and the BMC 130. In certain embodiments, the system interface 120 may be a typical standardized Intelligent Platform Management Interface (IPMI) system interfaces, such as a keyboard controller style (KCS) interface, a system management interface chip (SMIC) interface, or a block transfer (BT) interface. In certain embodiments, the BMC 130 may be connected to the computing device 110 via one or more interfaces replacing or in addition to the system interface 120. For example, the BMC 130 may be connected to the computing device 110 via a universal serial bus (USB) interface. In certain embodiments, data transfer between the computing device 110 and the BMC 130 may be in the format of IPMI messages, which goes through the system interface 120 or any other interfaces between the computing device 110 and the BMC 130.

The system 100 further includes multiple storage devices 160/170. Each of the storage devices may be a local storage device 170, or one or more remote storage devices 160 connected to the BMC 130 via the network connection 150. As shown in FIG. 1, the remote storage devices 160 may include disks D1, D2 and D3, which are respectively and independently connected to the BMC 130. In certain embodiments, the storage devices 160/170 may be used as virtual machine (VM) disks of the computing device 110.

The computing device 110 is a host computer of the BMC 130. In certain embodiments, the computing device 110 may be a general purpose computer or a headless computer. Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the computing device 110 may include, but not limited to, a processor 112, a memory 114, and other required memory and Input/Output (I/O) modules (not shown). In certain embodiments, the BMC 130 may also be a component on the baseboard. In certain embodiments, the processor 112 and the memory 114 may be embedded on the baseboard, or may be connected to the baseboard through at least one interface. In certain embodiments, the interface may be physical hardware interface such as electrical connectors, buses, ports, cables, terminals, or other I/O devices.

Further, the computing device 110 includes a storage device 116, which stores multiple software applications, including an operating system (OS) 117. In certain embodiments, the storage device 116 may be connected to the baseboard of the computing device 110. In certain embodiments, the computing device 110 may include at least one I/O device (not shown) for generating and controlling input and output signals of the computing device 110. Examples of the I/O device include keyboards, touch pads, mouse, microphones, display screens, touch screens, or other I/O devices applicable for the computing device 110. Some I/O devices, such as touch screens, are provided for the dual input/output purposes.

The processor 112 is a host processor which is configured to control operation of the computing device 110. In certain embodiments, the processor 112 may be a central processing unit (CPU). The processor 112 may execute the OS 117 or other applications of the computing device 110. In certain embodiments, the computing device 110 may run on or more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 is in communication with the processor 112 through a system bus (not shown).

The storage device 116 is a non-volatile data storage media for storing the OS 117 and other applications of the computing device 110. Examples of the storage device 116 may include flash memory, memory cards, USB drives, hard drives, floppy disks, optical drives, or any other types of data storage devices.

The OS 117 may be collective management software managing the operation of the computing device 110. For example, the OS 117 can include a set of functional programs that control and manage operations of the devices connected to the computing device 110. The set of application programs provide certain utility software for the user to manage the computing device 110. In certain embodiments, the OS 117 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, the OS 117 can also be compatible to the IPMI architecture for generating IPMI messages in order to communicate with the BMC 130.

The OS 117 may include a user interface (UI) module 118 and an original equipment manufacturer (OEM) module 119. The UI module 118 is configured to receive an input from a user, for example through keyboard, video, mouse (KVM). The received input can be converted to an IPMI OEM command by the OEM module 119. In certain embodiments, the OEM module 119 is uploaded from the BMC 130. In addition to receive input from the UI module 118, the OEM module 119 may also receive input from other sources, such as a remote input from the user.

In certain embodiments, the OEM module 119 may be used to generate a write protect command. In one embodiment, the write protect command may be an IPMI OEM command.

Figure 2A:
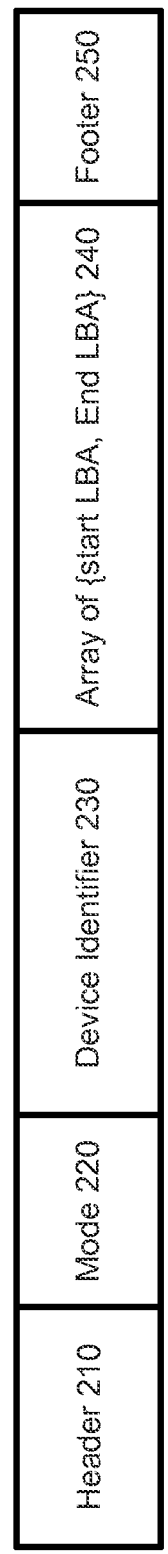
FIG. 2A schematically depicts an IPMI OEM message as a write protect command according to certain embodiments of the present disclosure.

FIG. 2A schematically depicts an IPMI OEM message as a write protect command according to certain embodiments of the present disclosure. As shown in FIG. 2A, the IPMI OEM message is used as a write protect command, which includes a header 210, a footer 250, and write protect information. In certain embodiments, the write protect information of the write protect command includes a mode identifier 220, a device identifier 230, and an array 240. The array 240 is configured to store a plurality of address values. In certain embodiments, the array 240 includes at least a plurality of fields of {Start LBA, End LBA}, and each of the fields is configured to store an address value. The mode identifier 220 is configured to define a write protect status of one of the local storage devices 170 of the BMC or remote storage devices 160 connected to the BMC. The write protect status includes write protect on and write protect off. In certain embodiments, the mode identifier 220 may have the value of 0 or 1, where 1 indicates that the write protect status is on, 0 indicates that the write protect status is off. In certain embodiments, the default value of the mode identifier 220 is 0, which means the default write protect status is off. The device identifier 230 is used for identifying the one of the multiple storage devices 160 and 170, such as one of the disks D1, D2 and D3, or the storage device 170. The array 240 stores multiple address values, such as {Start LBA, End LBA}, to define a write-protect portion of the one of the storage devices. In one example, a write protect command corresponds to disk D1 is provided to completely protect the disk D1 from writing. Accordingly in the write protect command, the value of the mode identifier 220 is set to be 1, the value of the device identifier 230 is set to correspond to disk D1, and the array 240 of {Start LBA, End LBA} may include address values covering the whole disk D1. In certain embodiments, the address values of the array 240 may be left empty to indicate the complete protection of this disk D1. In another example, a write protect command corresponds to disk D2 is provided to completely protect the disk D2 from writing. Accordingly, in the write protect command, the value of the mode identifier 220 is set to be 1, the value of the device identifier 230 is set to correspond to disk D2, and the array 240 of {Start LBA, End LBA} may include address values covering the whole disk D1. In certain embodiments, the address values of the array 240 may be left empty to indicate the complete protection of this disk D2. In a further example, a write protect command corresponds to disk D3 is provided to protect certain portion of the disk D3. Accordingly, in the write protect command, the value of the mode identifier 220 is set to be 1, the value of the device identifier 230 is set to correspond to disk D3, and the array 240 of {Start LBA, End LBA} may include address values corresponding to the specific portion of the disk D3 that needs to be protected.

In certain embodiments, a disk may be wholly or partially write protected. For example, a disk may have a certain protected area allocated as the partition table, which is generally protected to store the partition information of the disk. When a disk includes one or more partitions, each partition may include a boot sector area, which is also reserved for booting information and thus protected. In certain embodiments, a disk may include multiple partitions, in which some of the partitions may be write protected and other partitions writable. Thus, the write protect status of the disk, including the multiple paritions, may be configured by the IPMI message.

FIGS. 2B and 2C schematically depict a disk according to certain embodiments of the present disclosure, which can be configured by the IPMI OEM message for its write protect properties. The disk shown in FIGS. 2B and 2C may be any one of the remote disks D1, D2 and D3, and the local storage 170 of the BMC as shown in FIG. 1.

As shown in FIG. 2B, under one condition, such as running the system software by the computing device 110, the whole disk 3 are writable. In other words, the blocks 1-6 are all writable by the system software.

Under another condition, for example, before the system software exits, the system software changes the write protect configuration of the disk D3 using an IPMI OEM message, such that certain portions of the disk D3 are write protected. As shown in FIG. 2C, after the configuration by the IPMI OEM message, blocks 1, 3 and 5 are write protected, and the blocks 2, 4 and 6 remains writable. The IPMI OEM message may be the write protect command as shown in FIG. 2A, where the array of {start LBA, END LBA} 240 defines the write protect property of all of the blocks 1, 3 and 5. In one embodiments, the computing device 110 may send three IPMI OEM message, each is configured to define the write protect property of one of the blocks 1, 3, and 5.

As shown in FIG. 1, the OEM module 119 is located in the computing device 110. In certain embodiments, the OEM module 119 may also reside at other locations of the system. For example, a copy of the OEM module 119 may be provided in the firmware 140 of the BMC 130, such that the BMC 130 itself may be capable of generating the IPMI OEM command.

The BMC 130 is a specialized microcontroller that manages the interface between system management software and platform hardware. In certain embodiments, the BMC 130 may be a service processor (SP). Different types of sensors can be built into the computing device 110, and the BMC 130 reads these sensors to obtain parameters such as temperature, cooling fan speeds, power status, OS status, etc.

The BMC 130 monitors the sensors and can send out-of-band (OOB) alerts to a system administrator of the computing device 110 if any of the parameters do not stay within preset limits, indicating a potential failure of the computing device 110. In certain embodiments, the administrator can also remotely communicate with the BMC 130 from a remote management computer via a network to take remote action to the computing device 110. For example, the administrator may reset the computing device 110 from the remote management computer through the BMC 130, and may obtain system information of the computing device 110 OOB without interrupting the operation of the computing device 110.

As shown in FIG. 1, the BMC 130 includes a processor 132, a volatile memory 134 and a non-volatile memory 136.

In certain embodiments, one or more remote storage devices 160 may be connected to the BMC 130 via a network 150. In certain embodiments, the BMC 130 may include at least one storage device 170 located at the BMC 130. The system 100 is capable of performing dynamic write protect for whole or section of the storage devices 160 and/or 170 exposed by BMC. In certain embodiments, each of the storage devices 160 and the storage devices 170 may be one or more physical disks, or may be one or more virtual machine (VM) disks. For example, as shown in FIG. 1, the remote storage devices 160 may include disks D1, D2 and D3 labeled as 160-1, 160-2 and 160-3 respectively. The disks D1, D2, and D3 are remote storage devices connected to the BMC 130 through the network 150. When the disks D1, D2 and D3 are connected with the BMC 130, the configuration of the disks D1, D2 and D3 are stored in the data store 148, such that the BMC 130 can recognize the disks D1, D2 and D3. The configuration of the disks D1, D2, and D3 stored in the data store 148 may be a configuration file or a configuration table. In certain embodiments, the BMC 130 may include other components, such as at least one I/O device (not shown).

The processor 132 controls operation of the BMC 130. The processor 132 may execute the firmware 140 or other codes stored in the BMC 130. In certain embodiments, the BMC 130 may run on or more than one processor.

The volatile memory 134 may be a volatile memory, such as the RAM, for storing the data and information during the operation of the BMC 130. When the BMC 130 restarts, the contents stored in the volatile memory 134 will be lost.

As shown in FIG. 1, the non-volatile memory 136 stores the firmware 140 of the BMC 130 and has a data store 148. The data store 148 is configured to store configuration information of the storage devices 160. The configuration information may include the identification of the storage devices 160 so as to achieve redirection of the storage devices 160 with the computing device 110. The configuration information may further include write protect information of the storage devices 160, such that certain disks or certain portions of the storage devices 160 may be write protected. In certain embodiments, the configuration information may be stored as a configuration file or a configuration table. In certain embodiments, the non-volatile memory 136 may be a flash memory.

The firmware 140 of the BMC 130 includes computer executable codes or firmware for performing the operation of the BMC 130. As shown in FIG. 1, the firmware 140 includes, among other things, a redirection module 142, an IPMI module 144, and a filter module 146.

The redirection module 142 is configured to perform redirection of the storage devices 160 and/or the storage device 170, such that each of the storage devices 160 and/or the storage device 170 is accessible to the computing device 110. Specifically, the redirection module 142 is configured to receive a redirection command from the computing device 110. The redirection command includes redirect information of at least one of the storage devices 160/170. The redirection module 142 then processes the received redirection command to extract the redirect information, and stores the redirect information in the data store 148. In certain embodiments, by processing multiple redirect commands for multiple times, the redirection module 142 is capable of establish redirection of multiple storage devices 160/170, one storage device at a time. After the establishment of the redirection, when the redirection module 142 receives an access command to access a specific storage device of the storage devices 160 and/or the storage device 170, the redirection module 142 determines whether the access command is a read command or a write command. The access command may be from the computing device 110, or may be from other sources. In certain embodiments, when the redirection module 142 receives an access command from the computing device 110 or other sources, and determines that the access command is a write command, the redirection module 142 sends the write command to the filter module 146 for performing filtering operations. In certain embodiments, when the redirection module 142 receives an access command from the computing device 110 or other sources, and determines that the access command is a read command, the redirection module 142 reads the data from the storage devices 160.

The IPMI module 144 is configured to receive a write protect command, extract the write protect information from the write protect command, and pass the extracted write protect information to the filter module 146 for performing configuration of the filtering operations.

The filter module 146 is configured to, after receiving the write protect information from the IPMI module 144, stores the write protect information in the data store 148. Further, when the filter module 146 receives a write command from the redirection module 142, the filter module 146 in response performs the filtering operations to determine whether the data is writable to the storage devices 160 based on the write protect information. When the data is determined to be writable to the storage devices 160/170, the filter module 146 writes the data to the storage devices 160/170. When the data is determined to be not writable to the storage devices 160/170, the filter module 146 does not write the data to the storage devices 160/170. Thus, write protect of the storage devices 160/170 is achieved.

In certain embodiments, the filter module 146 is configured to perform the filtering operations as follows.

After receiving the write command from the redirection module 142, the filter module 146 retrieves device information from the write command. The device information indicates a specific storage from the storage devices 160/170, and the data is to be written to that specific storage. Then the filter module 146 determines the specific storage by comparing the device information from the write command with the device identifier of the write protect information stored in the data store. For example, the device information retrieved by the filter module 146 may correspond to the disk D3. The device identifiers of the write protect information stored in the data store includes the device identifier of each of the disks D1, D2, D3 and the storage device 170. By comparing the device information with the device identifiers, in this example, it is determined that disk D3 is the specific storage.

After determination of the specific storage, the filter module 146 further determines whether the data is writable to the specific storage by checking the mode identifier of the write protect information corresponding to the specific storage, In this example, the filter module 146 checks the mode identifier of the write protect information corresponding to the disk D3.

When the mode identifier of the write protect information corresponding to the specific storage indicates the write protect status of the specific storage to be write protect off, for example, the mode identifier of the write protect information corresponding to the disk D3 is 0, the filter module 146 then determines that the data is writable to the specific storage, i.e., the disk D3.

In certain embodiments, address information is further used in the above described filter operations. Specifically, after receiving the write command from the redirection module 142, the filter module 146 retrieves address information from the write command. The address information is a specific address in the specific storage, that is, a range of an array in the specific storage, so as to indicate a portion of a storage device, such as a portion of disk D3. When the mode identifier of the write protect information corresponding to the specific storage indicates the write protect status of the specific storage to be write protect on, the filter module 146 then determines whether the data is writable to the specific address in the specific storage by comparing the address information from the write command with the address values of the write protect information corresponding to the specific storage. If the address information from the write command is the same as the address values of the write protect information corresponding to the specific storage, that is, the write command instructs to write the data to the protected specific address of the specific storage, then the BMC will not perform the write process. In certain embodiments, if the address information from the write command is different from the address values of the write protect information corresponding to the specific storage, that is, the write command instructs to write the data to the non-protected specific address of the specific storage, then the BMC will perform the write process.

In certain embodiments, the filter module 146 may determine whether the data is writable by at least one of comparing the device identifier and comparing the address information as described above. In other words, the filter module 146 may determine whether the data is writable by comparing the device identifier, by comparing the address information, or by comparing both the device identifier and the address information.

In certain embodiments, the firmware 140 may include a monitoring module (not shown) for monitoring status of the computing device 110. In response to certain features of the monitored status or certain changes of the monitored status, the firmware 140 may change the write protect information, and store the write protect information at the data store 148. For example, when the fan speed is faster than a threshold speed or a temperature of a component is higher than a threshold, certain disks 160 may be write protected. The monitored components may include components of the computing device 110 and the one or more storages 160.

FIG. 3 schematically depicts a method of write protect configuration of a system according to certain embodiments of the present disclosure. The system may have the same structure as described above in FIG. 1.

In certain embodiments, once the storage devices 160/170 are connected to the BMC 130, the BMC 130 recognize those storage devices 160/170 and store the configuration information of the storage devices 160/170 in the data store 148 of the BMC 130, such that the storage devices 160/170 are accessible to the BMC 130. Further, in certain embodiments, before achieving dynamic write protect of the storage devices 160/170, the storage devices 160/170 needs to be redirected such that the storage devices 160/170 are accessible by the computing device 110.

In certain embodiments, the redirection of the storage devices 160/170 to the computing device 110 includes operations 305, 310 and 315. As shown in FIG. 3, at operation 305, the OEM module 119 of the computing device 110 sends a redirection command through the system interface 120 to the redirection module 142. The redirection command includes redirection information of at least one of the storage devices 160/170. In response to the received redirection command, at operation 310, the redirection module 142 processes the received redirection command to extract the redirection information. Subsequently, at operation 315, the redirection module 142 sends the extracted redirection information to the data store 148 and stores the extracted redirection information in the data store 148. In certain embodiments, the storing of the redirection information may include update the configuration information of the at least one of the storage devices 160/170 stored in the data store 148. The above described redirection process, that is, the operations 305, 310 and 315, may be repeated for each of the storage devices 160/170, such that the storage devices 160/170 are accessible by the computing device 110. The configuration information may be stored in the data store 148 as a configuration file or a table, and the configuration information may include the type and size of the disks, the name of the disks in the network 150, and the identity of the disks in the computing device 110.

In certain embodiments, in order to assign or change/update certain write protect properties to the at least one of the storage devices 160/170, the operations 320, 325, 330, and 335 are performed.

At operation 320, the IPMI module 144 receives a write protect command from the OEM module 119 of the computing device 110. The write protect command may include write protect information of a specific protected storage or/and a protected portion of the specific storage of the at least one of the storage devices 160/170.

In certain embodiments, the write protect command is an IPMI original equipment manufacturer (OEM) command as shown in FIG. 2A. The IPMI command includes the header 210, the mode 220, the device identifier 230, the array of {Start LBA, End LBA} 240, and the footer 250. The mode 220 may have the value of 0 or 1, where 1 indicates write protect is on, 0 indicates write protect is off, and the default is 0. The device identifier 430 identifies the specific one of the storage devices 160/170. The array of {Start LBA, End LBA} includes address values to define certain portion of the specific disk that needs to be protected. In one example, disk D1 is completely protected from writing, then the mode is 1, the device identifier 230 corresponds to disk D1, and the array of {Start LBA, End LBA} may include the whole disk D1 or may be vacant to indicate the complete protection of this disk. In one example, disk D2 is completely protected from writing, then the mode is 1, the device identifier 230 corresponds to disk D2, and the array of {Start LBA, End LBA} may include the whole disk D2 or may be vacant to indicate the complete protection of this disk. In one example, certain part of the disk D3 is protected from writing, then the mode is 1, the device identifier 230 corresponds to disk D3, and the array of {Start LBA, End LBA} corresponds to the specific areas in the disk D3 that needs to be protected. As described above, the protected storage and/or the protected portion of the storage may be identified by a device identifier corresponding to the specific protected storage and/or an address identifier corresponding to the specific protected portion of the storage, and the write protect command includes those device identifier and the address information corresponds to at least one of the storage devices 160/170.

At operation 325, in response to receiving the write protect command, the IPMI module 144 extracts the write protect information from the write protect command. The write protect information may include the mode 220, the device identifier 230, the array of {start LBA, END LBA} 240 as described above, to indicate the specific storage and/or the specific portion of the specific storage.

After extracting the write protect information, at operation 330, the IPMI module 144 passes the extracted write protect information to the filter module 146.

At operation 335, the filter module 146 processes the extracted write protect information, and stores the write protect information to the data store 148. The operation of storing the write protect information may be performed by updating the configuration information stored in the data store 148, such that the data store 148 contains the updated write protect information of the at least one of the storage devices 160/170 according to the write protect command generated by the OEM module 119.

The operations 320-335 may be performed repeatedly upon each of the storage devices 160/170, such that the write protected information of all the storage devices 160/170 are stored in the data store 148.

Further, the steps of 320-335 can be performed at any time as required to update/change write protect properties of at least one of the storage devices 160/170, thus dynamic write protect is achieved. In other words, under different cases, the write protect requirements for at least one of the storage devices 160/170 may be different from the previous case. By repeating the steps of 320-335, the write protect property of the storage devices 160/170 may be changed to be consistent with the write protect requirements. For example, a user may want disks D1 and D2 to be write protected at all times, and want disk D3 to be write protected when running a first application or a first command, and wants disk D3 to be writable by a second application or a second command. Accordingly, the user may configure disks D1, D2 and D3 to be write protected by repeating the steps 320-335. When the first application or the first command is running, none of the disks D1, D2 and D3 is writable.

When the user wants to run the second application or the second command, the user would further configure disk D3 by repeating the steps 320-335 such that the disk D3 is writable. Then, the second application or the second command can write to the disk D3.

In certain embodiments, the user may want to run a third application or a third command on certain portions of the specific storage device, such as disk D3. Accordingly, instead of configure the whole disk of D3 writable, the user may configure disk D3 by repeating the steps 320-335 such that the specific portion of the disk D3 is protected, and all the other portions of the disk D3 is writable. After the above configuration, the third application or the third command can write data to certain portions of the disk D3 other than the protected specific portion of the disk D3. The third application or the third command, may be a write command by the BMC 130. The write command may be received from the computing device 110, or other sources such as a read/write command received from a network remotely.

Figure 4:
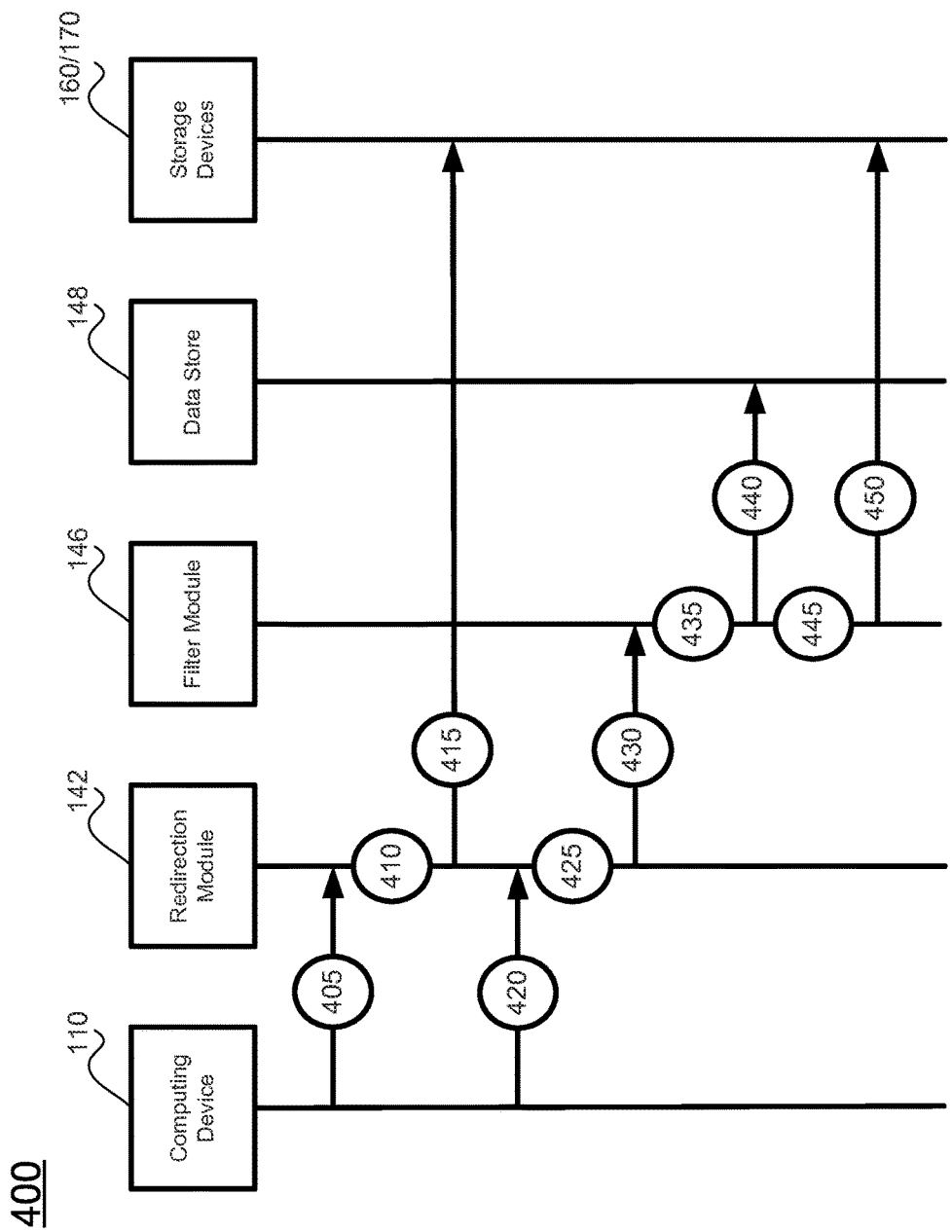
FIG. 4 schematically depicts a method of read/write in a system according to certain embodiments of the present disclosure.

FIG. 4 schematically depicts a method of read/write in a system according to certain embodiments of the present disclosure. In certain embodiments, as shown in FIG. 4, at operation 405, the computing device 110 sends a read command to the redirection module 142. In other embodiments, the read command may be sent from sources other than the computing device 110, such as a read command from a remote computing device through the network. The read command may be an IPMI command, a SCSI command, or any other commands performing read or/and writing to the storage devices 160.

At operation 410, the redirection module 142 processes the received read command and determines that it is read command. In response, at operation 415, the redirection module 142 read the at least one of the storage devices 160/170, such that the content of the at least one of the storage devices 160 is viewable from the computing device 110.

In certain embodiments, as shown in FIG. 4, at operation 420, the computing device 110 sends a write command to the redirection module 142. In other embodiments, the write command may be sent from sources other than the computing device 110, such as a write command from a remote computing device through the network. The write command may be an IPMI command, a SCSI command, or any other commands performing writing to the storage devices 160.

At operation 425, the redirection module 142 processes the received write command, and determines that it is write command. In response, at operation 430, the redirection module sends the write command to the filter module 146. The write command includes write information in regard to the targeted specific storage of the storage devices 160/170 or targeted portion of the storage devices 160 that the write command is to write on.

At operation 435, the filter module 146 retrieves device information and address information from the write command. The device information indicates a specific storage from the at least one storage of the storage devices 160/170, and the data is to be written to the specific storage. The address information indicates a specific address in the specific storage, such as the array of {Start LBA, END LBA} 240.

At operation 440, the filter module 146 may retrieves the device identifier of the write protect information stored in the data store 148 and/or address values of the write protect information corresponding to the specific storage, so as to compare the device identifier and the address information from the write protect command with the device identifier of the write protect information and address values of the write protect information corresponding to the specific storage stored in the data store 148.

At operation 445, the filter module 146 determines the specific storage by comparing the device information from the write command with the device identifier of the write protect information stored in the data store 148, and determines whether the data is writable to the specific storage by checking the mode identifier of the write protect information corresponding to the specific storage.

When the mode identifier of the write protect information corresponding to the specific storage indicates the write protect status of the specific storage to be write protect off, the data is determined to be writable to the specific storage. Then at operation 450, the filter module 146 writes the data to the specific storage. In certain embodiments, when the mode identifier of the write protect information corresponding to the specific storage indicates the write protect status of the specific storage to be write protect on, the data is determined to be not writable to the specific storage. Then the operation 450 is not possible, and the data is not written to the specific storage.

In certain embodiments, when the mode identifier of the write protect information corresponding to the specific storage indicates that the write protect status of the specific storage to be write protect on, the filter module 146 may further perform the operation 440 by determining whether the data is writable to the specific address in the specific storage by comparing the address information from the write protect command with the address values of the write protect information corresponding to the specific storage. Then at operation 445, whether the data is writable to the specific address in the specific storage is determined by comparing the address information from the write command with the address values of the write protect information corresponding to the specific storage. When the address information of the write protect information and the address values of the write protect information corresponding to the specific storage are different or do not have overlapped arrays, the data is determined to be writable to the specific address of the specific storage. Then at operation 450, the filter module 146 writes the data to the specific address of the specific storage. In certain embodiments, when the address information of the write protect information and the address values of the write protect information corresponding to the specific storage are the same or have overlapped arrays, the data is determined to be not writable to the specific address of the specific storage. Then the operation 450 is not possible, and the data is not written to the specific storage.

In a further aspect, the present disclosure is related to a non-transitory computer readable medium storing computer executable code. The code, when executed at one or more processer of a BMC 130, may perform the method as described above. In certain embodiments, the non-transitory computer readable medium may include, but not limited to, any physical or virtual storage media. In certain embodiments, the non-transitory computer readable medium may be implemented as the non-volatile memory 136 of the BMC 130 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
 a baseboard management controller (BMC), comprising a processor and a non-volatile memory storing a computer executable code; and
 at least one storage device connected to the BMC via a network,
 wherein the computer executable code, when executed at the processor, is configured to:
  perform redirection of the at least one storage device, such that the at least one storage device is accessible by a computing device, wherein the computing device accesses to the at least one storage device through a universal serial bus (USB) interface, the BMC and the network sequentially, and the perform redirection of the at least one storage device comprises:
   (a) receiving a redirection command from the computing device, wherein the redirection command includes redirect information of one of the at least one storage devices;
   (b) processing the redirection command to extract the redirect information; and (c) storing the redirect information in a data store;
receive a write protect command comprising write protect information of the at least one storage device from the computing device, wherein the redirection command is different, independent and separate from the write protect command;
extract the write protect information from the write protect command, wherein the write protect information comprises: a mode identifier to define a write protect status of the one of the at least one storage device, the write protect status being selected from write protect on or write protect off; a device identifier for identifying the one of the at least one storage device; and an array storing a plurality of address values, wherein the address values are configured to define a write-protected portion of the one of the at least one storage device;
store the write protect information in the data store of the non-volatile memory;
change write protect properties of the at least one of the storage devices;
repeat the perform, the receive, the extract and the store to change or update the write protect information of the at least one storage device, thereby achieving dynamic write protection of the at least one storage device;
in response to receiving, from the computing device, a write command to write data in the at least one storage device, determine whether the data is writable to the at least one storage device based on the write protect information stored in the data store, wherein the write command is different, independent and separate from the redirection command and the write protect command; and
in response to determining the data to be writable to the at least one storage device, write the data to the at least one storage device wherein the write protect command is an intelligent platform management interface (IPMI) original equipment manufacturer (OEM) command.

2. The system of claim 1, wherein when the data is determined to be not writable to the at least one storage device, the data is not written to the at least one storage device.

3. The system of claim 1, wherein the computer executable code, when executed at the processor, is further configured to:
in response to receiving a read command to read data from the at least one storage device from the computing device, read the data from the at least one storage device.

4. The system of claim 1, wherein the computer executable code, when executed at the processor, is configured to determine whether the data is writable to the at least one storage device based on the write protect information by:
retrieving device information from the write command, wherein the device information indicates a specific storage device from the at least one storage device, and the data is to be written to the specific storage device;
determining the specific storage device by comparing the device information from the write command with the device identifier of the write protect information stored in the data store; and
determining whether the data is writable to the specific storage device by checking the mode identifier of the write protect information corresponding to the specific storage device,
wherein the data is writable to the specific storage device when the mode identifier of the write protect information corresponding to the specific storage device indicates the write protect status of the specific storage device to be write protect off.

5. The system of claim 4, the computer executable code, when executed at the processor, is further configured to determine whether the data is writable to the at least one storage device based on the write protect information by:
retrieving address information from the write command, wherein the address information indicates a specific address in the specific storage device;
when the mode identifier of the write protect information corresponding to the specific storage device indicates the write protect status of the specific storage device to be write protect on, determining whether the data is writable to the specific address in the specific storage device by comparing the address information from the write command with the address values of the write protect information corresponding to the specific storage device.

6. The system of claim 1, wherein the computer executable code comprises:
an IPMI module, configured to receive the IPMI OEM command, and extract the write protect information from the IPMI OEM command;
a filter module, configured to store the write protect information in the data store; and
a redirection module, configured to:
perform redirection of the at least one storage device; and
in response to receiving the write command, send the write command to the filter module,
wherein the filter module, in response to receiving the write command from the redirection module, is configured to:
in response to receiving the write command, determine whether the data is writable to the at least one storage device based on the write protect information; and
when the data is determined to be writable to the at least one storage device, write the data to the at least one storage device.

7. The system of claim 6, wherein the redirection module is further configured to:
in response to receiving the read command to read data from the at least one storage device from the computing device, read the data from the at least one storage device.

8. The system of claim 1, wherein the at least one storage device is remotely connected to the BMC via the network.

9. A method of dynamic write protect, comprising:
performing, at a processor of a baseboard management controller (BMC), a redirection of at least one storage device connected to the BMC via a network, such that the at least one storage device is accessible by a computing device, wherein the computing device accesses to the at least one storage device through a universal serial bus (USB) interface, the BMC, and the network sequentially, and the performing redirection of the at least one storage device comprises:
(a) receiving a redirection command from the computing device, wherein the redirection command includes redirect information of one of the at least one storage devices;
(b) processing the redirection command to extract the redirect information; and (c) storing the redirect information in a data store;
receiving, at the processor of the BMC, a write protect command comprising write protect information of the at least one storage device from the computing device, wherein the redirection command is different, independent and separate from the write protect command;
extracting, by the processor of the BMC, the write protect information from the write protect command, wherein the write protect information comprises: a mode identifier to define a write protect status of the one of the at least one storage device, the write protect status being selected from write protect on or write protect off; a device identifier for identifying the one of the at least one storage device; and an array storing a plurality of address values, wherein the address values are configured to define a write-protected portion of the one of the at least one storage device;
storing, by the processor of the BMC, the write protect information in the data store of a non-volatile memory of the BMC;
changing write protect properties of the at least one of the storage devices;
repeating the performing, the receiving, the exacting and the storing to change or update the write protect information of the at least one storage device, thereby achieving dynamic write protection of the at least one storage device;
in response to receiving, from the computing device, a write command to write data in the at least one storage device, determining whether the data is writable to the at least one storage device based on the write protect information stored in the data store, wherein the write command is different, independent and separate from the redirection command and the write protect command; and
in response to determining the data to be writable to the at least one storage device, writing the data to the at least one storage device wherein the write protect command is an intelligent platform management interface (IPMI) original equipment manufacturer (OEM) command.

10. The method of claim 9, wherein when the data is determined to be not writable to the at least one storage device, the data is not written to the at least one storage device.

11. The method of claim 9, further comprising:
in response to receiving a read command to read data from the at least one storage device from the computing device, reading the data from the at least one storage device.

12. The method of claim 9, wherein the step of determining whether the data is writable to the at least one storage device based on the write protect information comprises:
retrieving device information and address information from the write command, wherein the device information indicates a specific storage device from the at least one storage device, and the data is to be written to the specific storage device, and wherein the address information indicates a specific address in the specific storage device;
determining the specific storage device by comparing the device information from the write command with the device identifier from the write protect information stored in the data store; and
determining whether the data is writable to the specific storage device by:

checking the mode identifier of the write protect information corresponding to the specific storage device, wherein the data is writable to the specific storage device when the mode identifier of the write protect information corresponding to the specific storage device indicates the write protect status of the specific storage device to be write protect off; and
when the mode identifier of the write protect information corresponding to the specific storage device indicates the write protect status of the specific storage device to be write protect on, determining whether the data is writable to the specific address in the specific storage device by comparing the address information from the write command with the address values of the write protect information corresponding to the specific storage device.

13. The method of claim 9, wherein the at least one storage device is remotely connected to the BMC via the network.

14. A non-transitory computer readable medium storing computer executable code, wherein the computer executable code, when executed at a processor of a baseboard management controller (BMC), is configured to:
perform redirection of at least one storage device connected to the BMC via a network, such that the at least one storage device is accessible by a computing device, wherein the computing device accesses to the at least one storage device through a universal serial bus (USB) interface, the BMC and the network sequentially, and the perform redirection of the at least one storage device comprises:
(a) receiving a redirection command from the computing device, wherein the redirection command includes redirect information of one of the at least one storage devices;
(b) processing the redirection command to extract the redirect information; and
(c) storing the redirect information in a data store;
receive a write protect command comprising write protect information of the at least one storage device from the computing device, wherein the redirection command is different, independent and separate from the write protect command;
extract the write protect information from the write protect command, wherein the write protect information comprises: a mode identifier to define a write protect status of the one of the at least one storage device, the write protect status being selected from write protect on or write protect off; a device identifier for identifying the one of the at least one storage device; and an array storing a plurality of address values, wherein the address values are configured to define a write-protected portion of the one of the at least one storage device;
store the write protect information in the data store of a non-volatile memory of the BMC;
change write protect properties of the at least one of the storage devices;
repeat the perform, the receive, the exact and the store to change or update the write protect information of the at least one storage device, thereby achieving dynamic write protection of the at least one storage device;
in response to receiving, from the computing device, a write command to write data in the at least one storage device, determine whether the data is writable to the at least one storage device based on the write protect information stored in the data store, wherein the write command is different, independent and separate from the redirection command and the write protect command; and in response to determining the data to be writable to the at least one storage device, write the data to the at least one storage device wherein the write protect command is an intelligent platform management interface (IPMI) original equipment manufacturer (OEM) command.

15. The non-transitory computer readable medium of claim 14, wherein when the data is determined to be not writable to the at least one storage device, the data is not written to the at least one storage device.

16. The non-transitory computer readable medium of claim 14, wherein the computer executable code, when executed at the processor, is further configured to:

in response to receiving a read command to read data from the at least one storage device from the computing device, read the data from the at least one storage device.

17. The non-transitory computer readable medium of claim 14, wherein the computer executable code, when executed at the processor, is configured to determine whether the data is writable to the at least one storage device based on the write protect information by:

retrieving device information and address information from the write command, wherein the device information indicates a specific storage device from the at least one storage device, and the data is to be written to the specific storage device, and wherein the address information indicates a specific address in the specific storage device;

determining the specific storage device by comparing the device information from the write command with the device identifier from the write protect information stored in the data store; and determining whether the data is writable to the specific storage device by:

checking the mode identifier of the write protect information corresponding to the specific storage device, wherein the data is writable to the specific storage device when the mode identifier of the write protect information corresponding to the specific storage device indicates the write protect status of the specific storage device to be write protect off; and when the mode identifier of the write protect information corresponding to the specific storage device indicates the write protect status of the specific storage device to be write protect on, determining whether the data is writable to the specific address in the specific storage device by comparing the address information from the write command with the address values of the write protect information corresponding to the specific storage device.

18. The non-transitory computer readable medium of claim 14, wherein the at least one storage device is remotely connected to the BMC via a network.

* * * * *